US012254853B2

(12) United States Patent
Caragher

(10) Patent No.: US 12,254,853 B2
(45) Date of Patent: Mar. 18, 2025

(54) ELECTROMAGNETIC SCANNING METRONOME

(71) Applicant: Thomas P. Caragher, Johns Creek, GA (US)

(72) Inventor: Thomas P. Caragher, Johns Creek, GA (US)

( * ) Notice: Subject to any disclaimer, the term of this patent is extended or adjusted under 35 U.S.C. 154(b) by 0 days.

(21) Appl. No.: 17/803,141

(22) Filed: Mar. 3, 2022

(65) Prior Publication Data

US 2022/0284872 A1 Sep. 8, 2022

Related U.S. Application Data

(60) Provisional application No. 63/207,554, filed on Mar. 3, 2021.

(51) Int. Cl.
*G10G 7/00* (2006.01)
*G04F 5/02* (2006.01)
*G10G 1/00* (2006.01)

(52) U.S. Cl.
CPC ............... *G10G 7/00* (2013.01); *G04F 5/025* (2013.01); *G10G 1/00* (2013.01)

(58) Field of Classification Search
CPC ............. G10G 7/00; G10G 1/00; G04F 5/025
See application file for complete search history.

(56) References Cited

U.S. PATENT DOCUMENTS

| | | | | |
|---|---|---|---|---|
| 3,996,833 A * | 12/1976 | del Castillo | G09B 15/023 | 84/484 |
| 4,070,944 A * | 1/1978 | del Castillo | G04F 5/02 | 84/478 |
| 4,366,741 A * | 1/1983 | Titus | G09B 15/023 | 84/478 |
| 7,385,128 B2 * | 6/2008 | Lawliss | G04F 5/025 | 84/484 |
| 11,636,834 B2 * | 4/2023 | Lu | G10G 1/00 | 84/453 |
| 2006/0117937 A1 * | 6/2006 | Lawliss | G04F 5/025 | 84/484 |
| 2022/0284872 A1 * | 9/2022 | Caragher | G10G 7/00 | |

* cited by examiner

*Primary Examiner* — Robert W Horn
(74) *Attorney, Agent, or Firm* — TOD R. NISSLE, P.C.

(57) ABSTRACT

An electromagnetic scanning metronome comprises a laser to produce a beam of light, and comprises a surface to reflect the beam of light to produce a visible line of light which extends over an image of sheet music. The metronome includes apparatus to move the laser and visible line of light from left to right with respect to the image of sheet music.

4 Claims, 3 Drawing Sheets

ELECTROMAGNETIC SCANNING METRONOME

This application claims priority based on U.S. Provisional Patent Application Ser. No. 63/207,554 filed Mar. 3, 2021.

This invention relates to music.

More particularly, the invention relates to a method and apparatus for reading sheet music. The sheet music may be read while playing an instrument, while singing, while conducting other musicians, while recording music in a studio, or at any other desired time.

Helping an individual maintain a desired pace while reading music has long been a focus in the prior art in music. As a result, a variety of metronomes have been developed over the years. Accordingly, it would be highly desirable to provide a new method and apparatus for keeping time while reading music.

Therefore, a principal object of the invention is to provide a new method and apparatus for reading music.

This, and other objects of the invention, will be apparent from the following description of the invention, taken in conjunction with the drawings, in which.

Briefly, provided in combination with an image of sheet music is an electromagnetic scanning metronome. The metronome comprises a laser producing a beam of light, a surface to reflect the beam of light to produce a visible line of light which extends over the image of sheet music, and apparatus to move the laser and visible line of light from left to right with respect to the image of sheet music.

Figure 1:
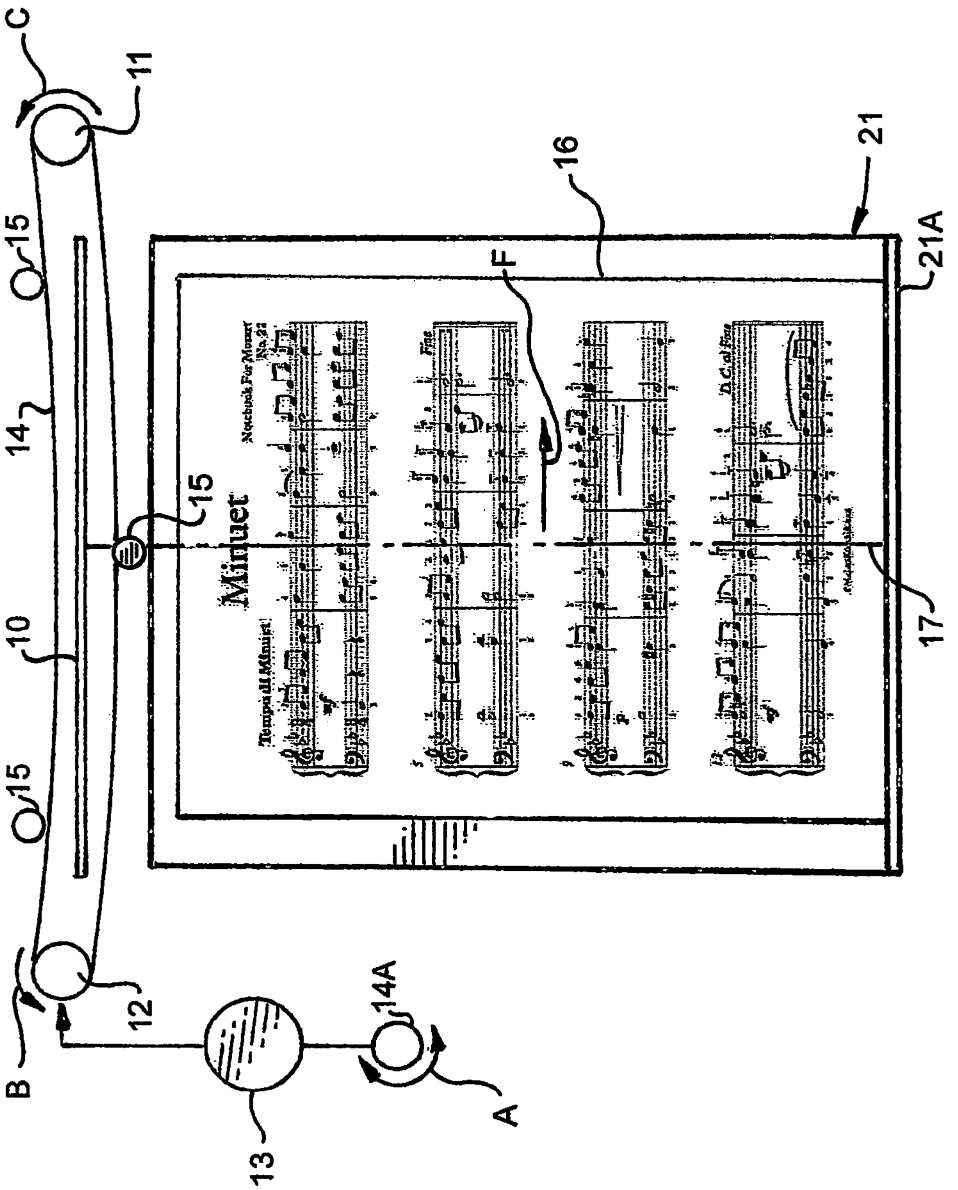
FIG. 1 is a diagram illustrating apparatus constructed in accordance with one embodiment of the invention.
Figure 2:
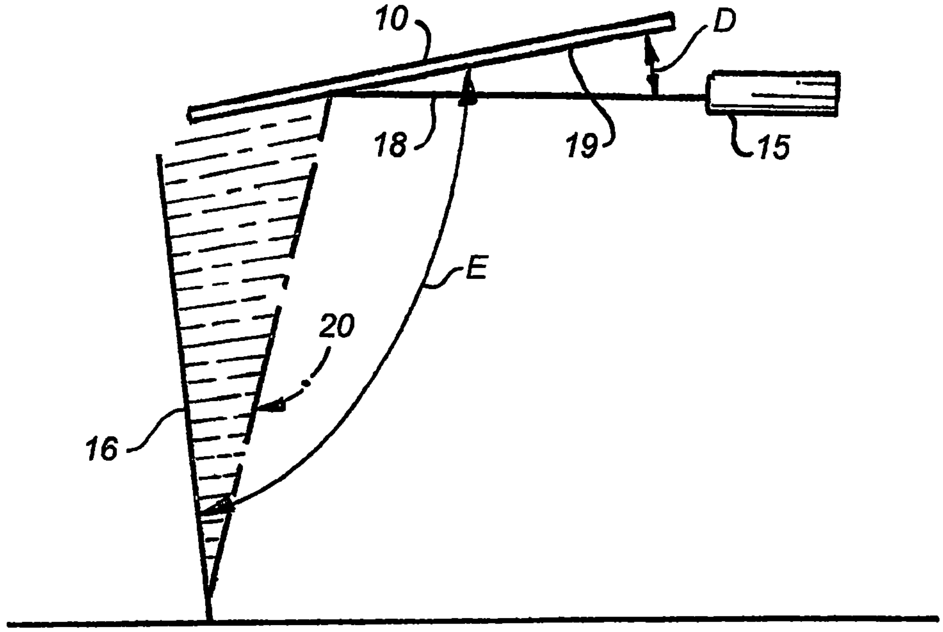
FIG. 2 is a diagram further illustrating the mode of operation of the apparatus of FIG. 1; and, FIG. 3 is a diagram illustrating an alternate embodiment of the invention.

A presently preferred embodiment of the invention is illustrated in FIGS. 1 and 2. The invention produces a thin vertically oriented visible line of light 17 which travels from left to right across a page 16 of sheet music being utilized and read by an individual. The individual can see the line 17. As would be appreciated by those of skill in the art, apparatus of the invention can, if desired, be modified so that line 17 is horizontally oriented and travels down (or up) page 16.

A light beam 18 (FIG. 1) from a laser pen 15 is reflected off surface 19 (FIG. 2) to produce visible line of light 17. Pen 15 produces a highly directional, monochromatic, coherent beam 18 of light. The shape and dimension of a pen 15 can vary as desired. Each laser pen 15 presently used in the invention is approximately an inch long and about one-quarter inch in diameter.

Each laser pen 15 is mounted on and carried by timing belt 14. At the moment, the timing belt preferably is about 15 mm wide to support each laser pen 15. At least two lasers preferably are mounted on timing belt 14 to insure that at most times least one laser 15 pen is pointed at panel 10 and is producing a line 17 on page 16 of sheet music. To insure that at all times a line of light 17 appears on page 16 of sheet music, it is presently desired and necessary that three (3) laser pens be mounted at equal intervals on belt 14.

Variable speed motor 13 provides the motive power to rotate pulleys 11 and 12 to move belt 14 in the directions indicated by arrows B and C in FIG. 1. Knob 14 is rotated in the directions of arrows A to control and vary the speed at which pulleys rotate and move belt 14. Any desired apparatus can be utilized to mount pulleys 11 and 12 and interconnect motor 13 and pulleys 11 and 12. Pulleys 11 and

12 can, as is well known, be mounted on shafts which are rotated using motive power from motor 13.

Reflective panel 10 presently is stationary. Panel 10 presently preferably comprises stainless steel and includes reflective surface 19 (FIG. 2). Surface 19 includes small parallel striations or lines. Panel 10 is positioned so these striations are perpendicular the beam 18 and reflect beam 18 to produce a field or swath 20 (FIG. 2) of light which forms a clearly distinguishable line of light 17 on page 16. If panel 10 is positioned so these striations are parallel to beam 18, an "arc" of light instead of a line of light 17 is formed. Such an arc of light is not desired in the practice of the invention because it does not form a distinct line of light 17 on a page 16 of music.

Page 16 can, by way of example and not limitation, comprise an actual paper sheet of music that includes the printed image of music, or can comprise a screen (of an I-pad for example) or other surface or apparatus that produces an image or picture of a page of sheet of music by a means other than simply by printing on paper or some other material.

In FIG. 2, angle D (the angle between beam 18 and surface 19) and angle E (the angle between surface 19 and the page 16) can vary as desired. Angle D however, is currently preferably in the range of 45 to 60 degrees. Angle D (and angle E) can vary depending on the "tilt" of page 16. In FIG. 2, page 16 is slightly tilted away from vertical and away from laser pen 15. In FIG. 2, it is presumed that in the practice of the invention beam 18 typically is horizontally oriented. This too can vary as desired. In some orientations of page 16 and panel 10, it may be desirable to vary the orientation of beam 18 up or down away from a horizontal orientation.

The composition and makeup of panel 10 and reflective surface 19 can vary as desired. It is noted, however, that finding a surface which would adequately reflect a laser beam and produce a line of light 17 required testing. Polished brass did not appear to work. Aluminum foil did not appear to work. A mirror did not appear to work and to produce a distinct, visible line of light 17 on an image of sheet music. Accordingly, stainless steel is presently preferred in the practice of the invention.

There are five different types of stainless steel: austenitic, ferritic, martensitic, duplex (austenitic-ferritic), and precipitation.

Austenitic

Grades 304 and 316 are the most common grades of stainless steel, and are austenitic. Austenitic steel has up to 35% nickel and has 16-26% chromium.

Ferritic

Ferritic steels are non hardenable by heat treatment and are only somewhat hardenable by cold working. These steels contain less than 0.2% carbon.

Martensitic

These steels have up to 1.2% carbon and also include 11 to 18% chromium. They are hardenable by heat treatment.

Austenitic-Ferritic (Duplex)

These alloy steels include 0.05 to 5% molybdenum, 1.35 to 8% nickel, 0.05 to 3% copper, and 21 to 27% chromium. These steels are stronger than austenitic or territic steel.

Precipitation Hardening

These steels are unusually strong and include less than 0.5% aluminum, copper, and niobium; include 3 to 5% nickel, and include 15 to 17.5% chromium.

Any desired apparatus can, in accordance with the invention, be used to produce a line of light which travels across sheet 16 or another object in any desired direction and at any desired rate of travel. The light source can, for example, be mounted at the bottom (or side), instead of the top, of page 16. A light source may be relatively self-contained and produce a "line of light" on page 16 which travels over page 16 without requiring the use of a reflective surface 10. The line 17 of light may travel across page 16 in any desired direction. Line 17 may travel across page 16 so that line 17 is not horizontally or vertically oriented and is, instead, canted at a desired angle. The width, color, intensity, and other shape and dimension of line 17 can vary as desired.

In an alternate embodiment of the invention, line 17 does not extend completely from the top to the bottom of page 16. Instead, line 17 is shortened and truncated and extends vertically only a distance sufficient to span the height of one of the lines of notes on page 16. As the user reads the music on page 16 and moves from one line down to the next line, the truncated line 17 simultaneously moves down to and only extends across the next line of music while the line 17 travels from left to right across page 16.

In another embodiment of the invention, laser pen 15 is stationary and the orientation of surface 10 changes.

The apparatus of the invention can be used for other endeavors which require progress to be tracked at a desired rate or speed.

Figure 3:
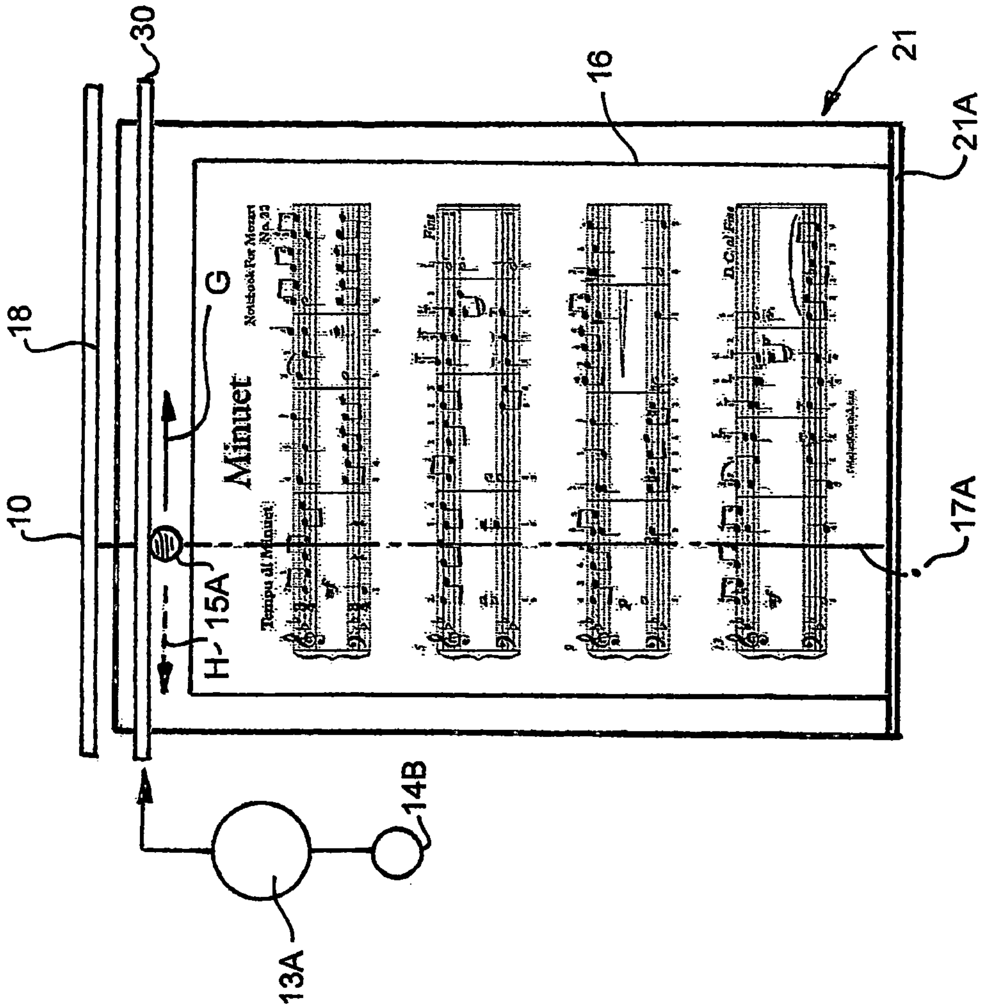

A further embodiment of the invention is illustrated in FIG. 3 and includes a laser pen 15A or other source of a beam 18. Pen 15A is mounted on a stationary rail 30 and moves from left to right in the manner indicated by arrow G. Panel 10 is, as is the case in the embodiment of the invention in FIG. 1, stationary. As is also the case with the embodiment of the invention in FIG. 1, when pen 15A moves from left to right in the direction of arrow G (FIG. 3), line of light 17A moves simultaneously from left to right across page 16. When, however, pen 15A reaches the end of its travel at the right hand end of rail 30, it quickly indexes back to the other end (i.e., the left hand end) of rail 30 in the direction of arrow H and once again begins it travel—normally at a slower rate—from left to right in the direction of arrow G.

Variable speed motor 13A provides the motive power to move pen 15A back and forth along rail 30. Any desired apparatus can be utilized to transmit motive power from variable speed motor 13A to pen 15A so that pen 15A can be moved along rail 30 in the manner described herein. Dial 14B is rotated to vary to speed of motor 13A and to vary the rate or speed at which pen 15A moves in the direction of arrow G. Means other than a variable speed motor can be used to vary the speed of movement of a pen 15, 15A or other light source.

The speed at which line of light 17 moves from left to right over page 16 is typically constant and does not vary during the time the line of light 17 makes one pass from the left side of page 16 to the right side of page 16. For example, if line of light 17 and laser pen 15, 15A move at a rate of one inch per second, this speed or rate of movement stays the same each time the line of light 17 completes one pass across page 16. And, if the line of light is moving at a rate of two inches per second, this speed or rate of movement stays the same each time the line of light 17 completes one pass across page 16. In some embodiments of the invention, however, apparatus of the invention is programmed so that the speed or rate of movement of line of light 17 varies during the time it takes laser pen 15, 15A to make a single pass from the left side of page 16 to the right side of page 16.

One of the virtues of the electromagnetic metronome apparatus of the invention is that it can be produced in a configuration which is lightweight, is portable, is compact, and can be utilized in conjunction with existing paper sheet music or with other existing apparatus which displays music.

In one presently preferred configuration of the electromagnetic metronome apparatus, the motor used to drive the belt in FIG. 1 is about three inches long and one and one half inches in diameter. The three inch length includes the spindle which extends outwardly from the motor. The entire apparatus—including the motor, belt, pulleys, laser pens, and stainless steel reflective panel—weighs approximately one to two pounds. When, by way of example and not limitation, paper sheet music is supported on a music stand, the apparatus can be positioned above the top of the sheet music and clipped to the top edge of the music stand. Or, a pair of spaced apart support legs can be attached to the apparatus such that the legs each extend downwardly from the apparatus and contact and rest on the lip of the music stand. The legs are spaced apart. Each of the legs is spaced outwardly away from one of the parallel vertical edges of the paper sheet music. Neither leg overlies the sheet music or obstructs the view by a musician of the sheet music.

Apparatus used to mount or support the metronome apparatus of the invention can vary as desired, as can the apparatus used to construct the metronome apparatus of the invention.

Having described my invention in such terms to enable those of ordinary skill in the art to make and use the invention, and having described presently preferred embodiments thereof, I claim:

1. In combination with an image of sheet music, an electromagnetic scanning metronome comprising
- (a) at least one laser producing a beam of light,
- (b) a stationary surface
  - (i) canted with respect to said beam of light,
  - (ii) including parallel striations perpendicular to said beam,
  - (iii) reflecting said beam of light to produce a swath (20) of light forming a vertically oriented, elongate, visible line of light (17) on and moving across said image of sheet music, and
- (c) apparatus to move simultaneously said laser and visible line of light from left to right with respect to said image of sheet music.

2. The metronome of claim 1 wherein
- (a) said image of sheet music includes a top and a bottom, and
- (b) said line of light extends from said top to said bottom of said image of sheet music.

3. In combination with an image of sheet music, an electromagnetic scanning metronome comprising
- (a) a plurality of lasers (15) each producing a beam of light,
- (b) a stationary surface
  - (i) canted with respect to said beams of light produced by said lasers, and
  - (ii) reflecting periodically each of said beams of light to produce a swath (20) of light forming a vertically oriented, elongate, visible line of light (17) on and moving across said image of sheet music, and
- (c) apparatus to move simultaneously each of said lasers
  - (i) $1^{st}$ from left to right to reflect said beam of light produced by said laser off said stationary surface to form a vertically oriented visible line of light on and moving across said image of said sheet music, and
  - (ii) $2^{nd}$ from right to left such that said beam of light produced by said laser is prevented from reflecting off said stationary surface to produce a visible vertically oriented visible line of light on and moving across said image of said sheet music.

4. The metronome of claim 3 wherein (a) said image of sheet music includes a top and a bottom, and (b) said line of light extends from said top to said bottom of said image of sheet music.

* * * * *